March 13, 1951     A. W. MILLER     2,544,712
COUPLING

Filed Nov. 10, 1945     3 Sheets-Sheet 1

INVENTOR.
ALBERT W. MILLER

BY
*Bartlett Eyre Keeler [signature]*

ATTORNEYS

March 13, 1951          A. W. MILLER          2,544,712
COUPLING
Filed Nov. 10, 1945          3 Sheets-Sheet 2
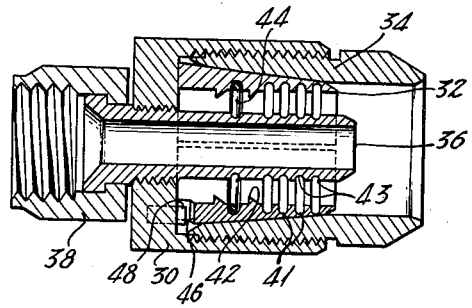
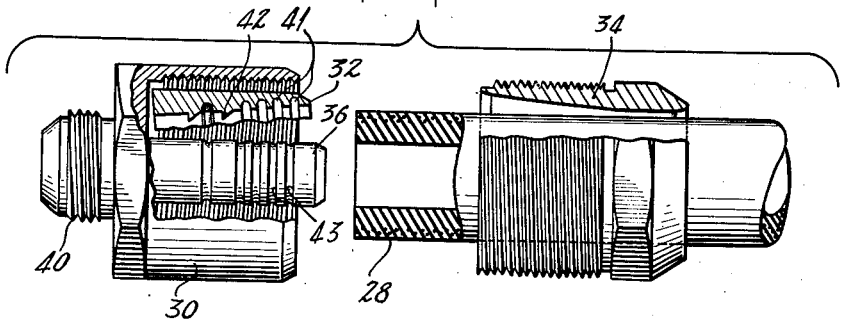
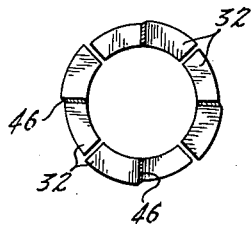 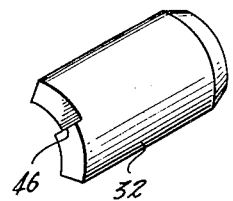 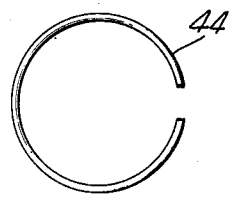
INVENTOR.
ALBERT W. MILLER
BY
*Bartlett Eyre Keel & Weymouth*
ATTORNEYS March 13, 1951  A. W. MILLER  2,544,712
COUPLING
Filed Nov. 10, 1945  3 Sheets-Sheet 3

INVENTOR.
ALBERT W. MILLER
BY
*Bartlett Eyre Keel & Weymouth*
ATTORNEYS

Patented Mar. 13, 1951

2,544,712

UNITED STATES PATENT OFFICE 2,544,712

COUPLING

Albert W. Miller, Jamaica, N. Y.

Application November 10, 1945, Serial No. 627,880

7 Claims. (Cl. 287—80)

1

The present invention relates to couplings, and has special reference to detachable couplings for rods, tubes, and reinforced hose.

The principal object of the invention is to provide a coupling of this character which is of simple and strong construction, which may be easily applied and detached, and in which the parts are so held as to effectively prevent loosening thereof when subjected to vibrations and other strains to which such couplings may be subjected.

The several features of the invention, whereby this and other objects may be attained, will be readily understood from the following description and accompanying drawings, in which:

Fig. 4 is a longitudinal sectional view of a modified form of coupling;

Fig. 5 is an exploded sectional elevation of the same, shown being applied to a reinforced hose, and also showing a screw-threaded terminal connection instead of the swivel shown in Fig. 4;

Fig. 6 is an inner end view of a segmental clamping collar constituting a part of the coupling;

Fig. 7 is a view in perspective of one of the segments of the segmental clamping collar;

Fig. 8 is a side view of a wire spring which may be used in association with the segmental clamping collar;

Figure 1:
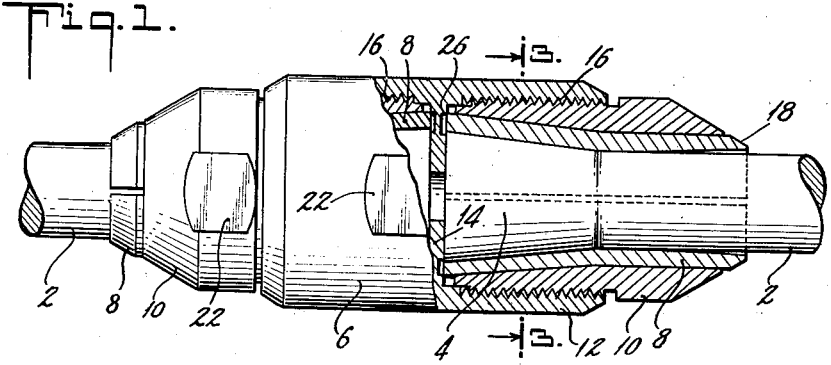
Figure 1 is a longitudinal sectional view partly in elevation, taken substantially on the line 1—1 of Fig. 3, of a coupling embodying features of the invention in their preferred form, shown connecting two rods such as sections of a pump rod.

The coupling illustrated in the drawings is of

2 the type of the one described and claimed in my Reissue Letters Patent No. 22,810, dated November 5, 1946.

The coupling illustrated in Fig. 1 is shown connecting two rods 2 which may be the sections of a pump rod for deep wells, each rod or rod section having a flaring end portion 4.

The coupling comprises a body member 6, contractible collar 8, and clamping sleeve 10. The collar 8 may be made up of contractible segments as shown, or may be otherwise radially contractible. The body member 6 has oppositely directed sleeve extensions or bosses 12 which are separated by a partition 14, which may be an integral part of the body member or consist of a separate disk pressed or screw-threaded to a central position in the body member. The inner cylindrical surface of each boss 12 is provided with screw-threads 16.

Each segmental collar 8 is made up of a plurality of segments, preferably four segments. Each segment has its inner portion for substantially one-half of its length, flared at an angle corresponding substantially to the angle of the flared end portion of the rod 2. The segments are curved transversely so that when the segments of each collar are positioned about the rod, the flared portions thereof are adapted to embrace the flared surface of the rod and the remaining portions of the segments embrace the adjacent cylindrical body portion of the rod. The segments are provided with beveled outer ends 18.

As shown, each clamping sleeve 10 is of slightly less length than the associated segmental collar 8, and the interior surface of the inner portion thereof is flared at an angle corresponding substantially to the angle of the flare of the outer surface of the segmental collar. The remaining outer portion of the clamping sleeve is cylindrical. The inner portion of the outer surface of the clamping sleeve 10 is provided with screw-threads 20 so as to enable the clamping sleeve to be screw-threaded into one of the bosses 12. The exterior surface of the outer portion of each clamping sleeve 10 and also the exterior surface of the body member 6, are provided with flattened portions 22 to enable wrenches to be applied to the two members.

Figure 2:
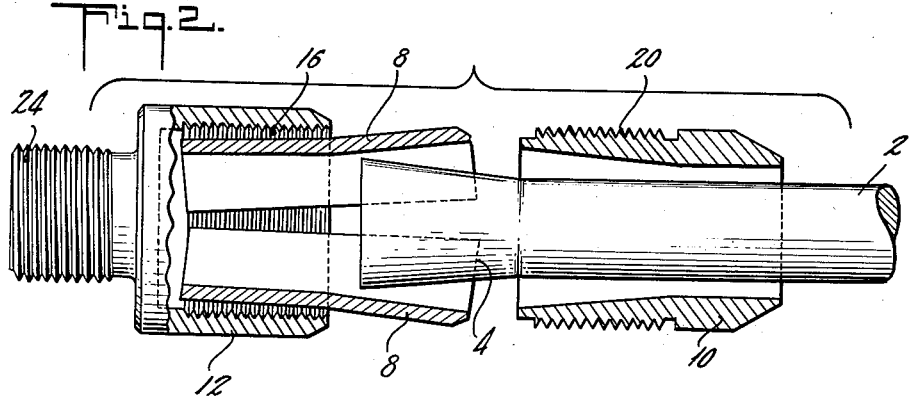
Fig. 2 is an exploded longitudinal sectional elevation of the coupling but in the form of a terminal coupling, shown being applied to one end of a rod.
Figure 3:
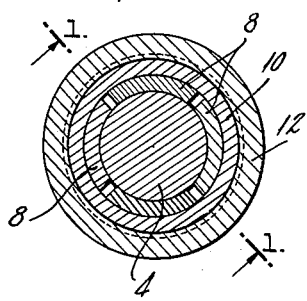
Fig. 3 is a transverse sectional view taken on the line 3—3 of Fig. 1.

The terminal coupling shown in Fig. 2 is provided with the segmental collar 8, clamping sleeve 10, and boss 12 projecting from the body member and is shown further provided with a screw-threaded terminal boss 24 on the outer end thereof.

In applying the coupling of Figs. 1 and 2 to the end of a rod or rod section 2, the clamping sleeve 10 may be passed over the flared end 4 of the rod and the end of the rod placed within collar 8 and abutting against the bottom wall of boss 12, the inner portion of the collar being surrounded by the boss as illustrated in Fig. 2. The clamping sleeve 10 may then be passed over the outer ends of the segmental collar and screwed into the boss 12 until the parts reach their final clamping position as shown in Fig. 1.

It will be noted that as the clamping sleeve 10 is tightened in the boss, it acts through the flaring surfaces of the segmental collar to cause the collar to firmly grip the flared end of the rod. As the clamping sleeve approaches its final clamping position, the segmental collar tends to ride up on the flared end of the rod which increases the clamping pressure. In case under extreme clamping pressure, the inner ends of the segments of the collar may be forced somewhat beyond the end of the rod, the bottom wall of the boss has an annular groove 26 which provides a clearance space for the inner ends of the segments. Also this groove 26 is adapted to receive means for attaching the inner end of the collar so as to retain the collar within the boss when the clamping sleeve is removed.

The screw-threaded telescoping engagement of the clamping sleeve and the boss provides a double ring of great strength that encases the segmental collar and the clamped portion of the rod. The segmental collar embraced by the clamping sleeve throughout substantially its length reinforces the rod at a point remote from the end thereof. By forming the outer ends of these segments with a slight taper, as indicated in Fig. 1, an abrupt line of contact with the rod is avoided, and a means provided to distribute vibration over a zone of increasing pressure so as to prevent breakage.

When the threaded clamping sleeve is drawn up tightly in the threaded boss of the coupling member, there is established a radial pressure which tends to hold the threads of these parts firmly in mesh and to substantially reduce the possibility of the threads bending or stripping off when the connection is subjected to heavy strain. This radial pressure, induced by the wedging action of the cooperating angled-bearing surfaces, also serves to prevent the threaded connection from working loose in service.

It will be apparent that my improved coupling as illustrated in Figs. 1 and 2 when used for the sections and terminals of pump rods for deep wells is capable of effectively withstanding the great strain to which it is subjected, due to vibration and reciprocation of the pump rod, without loosening of parts or lost motion occurring.

By beveling the outer ends of the segmental collar 8, clamping sleeve 10 and the boss 12 as shown, abrupt shoulders or other projections on the outer surface of the coupling are avoided. This is of particular advantage when the coupling is used for sections of pump rods for deep wells.

The coupling illustrated in Figs. 4 and 5 is especially adapted for holding a wire reinforced rubber hose 28 such as high pressure hose. This coupling, like that shown in Figs. 1 and 2, is provided with a body member 30, segmental collar 32, and a clamping sleeve 34. The coupling is further provided with an extended nipple 36 which as shown in Fig. 4 has its inner end screw-threaded through an aperture in the transverse wall of the body member, and its outer end provided with a swivel connection 38. In the form shown in Fig. 5 the outer end of the nipple is shown provided with a screw-threaded terminal boss 40. In this form the nipple and boss may be formed integral with body member 30.

As shown the inner surfaces of the segments of the segmental collar are provided with serrations 41 and teeth 42 and the nipple is also provided with serrations 43 for engaging the outer and inner surfaces of the hose 28 when the hose is placed on the nipple and the coupling is tightened into its final clamping position. Also, as shown, a spring 44 in the form of a split circular spring wire is positioned in grooves in the segments of the segmental collar so as to tend to maintain the segments spread apart. In Figs. 4, 6 and 7 there is shown a notch in the end of each segment forming a shoulder 46 which is adapted to engage a stop pin 48 on the bottom wall of the boss 30. This pin and shoulder connection limits the turning movement of the segments of the segmental collar when the clamping sleeve 34 is rotated.

It will be apparent that similar devices including the spring 44, and shoulder and stop pin connection 46 and 48 may be employed in the coupling of Figs. 1 and 2 if desired.

In applying the coupling of Figs. 4 and 5, the clamping sleeve 34 is placed over the end of the reinforced rubber hose 28 and the nipple 36 is forced into the end of the hose. This positions the end of the hose within the segmental collar 32 and the boss on the body member 30. The clamping sleeve 34 may then be screw-threaded into the boss, thus causing the segmental collar to tightly clamp the end of the hose on the nipple with the teeth 42 embedded in the material of the hose, thus assisting in securely holding the hose in place.

In detaching the coupling by unscrewing the body member 30 and the clamping sleeve 34, the spring 44 acts to release the segmental collar from the hose, thus permitting the hose to be removed from the coupling.

The inner end of the clamping sleeve 34 is tapered and the outer end of the segments of the segmental collar are likewise tapered but in the opposite direction, and this end of the collar may project a slight distance beyond the end of the boss. These two tapered faces enable the end of the clamping sleeve 34 to easily slide between the outer surface of the segmental collar, as it is held open or expanded by the spring 44, and the inner surface of the boss so as to permit the threaded surfaces of the clamping sleeve and boss to engage.

The rotation of the clamping sleeve 34 will cause it to advance on the cooperating threads and cause its cone-shaped inner surface to thus force a wedge in behind the segmental collar in such a way as to squeeze the segments together, and cause the teeth on their inner face to penetrate the surface of the hose, and the high point of the serrations of both the segments and the nipple to become embedded from opposite sides in the wall of the hose. Because of the long, thin wedging action provided in this construction, a powerful pressure force may be applied to the wall of the hose lying between the nipple and the inner face of the segmental collar.

The inner surface of the outer end of the clamping sleeve 34 is formed with a taper to provide a smooth bearing surface and permit the hose to be gradually bent when flexed at the coupling. This prevents damage to the hose wall which occurs when the hose is bent or flexed over the end of a shaft sleeve.

Figure 9:
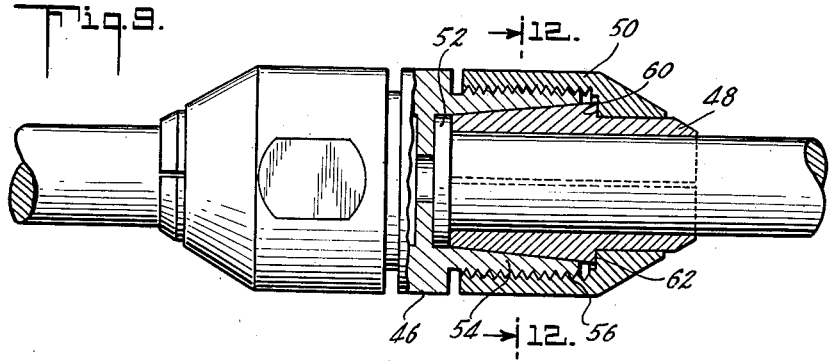
Fig. 9 is a view similar to Fig. 1 of another modified construction.
Figure 10:
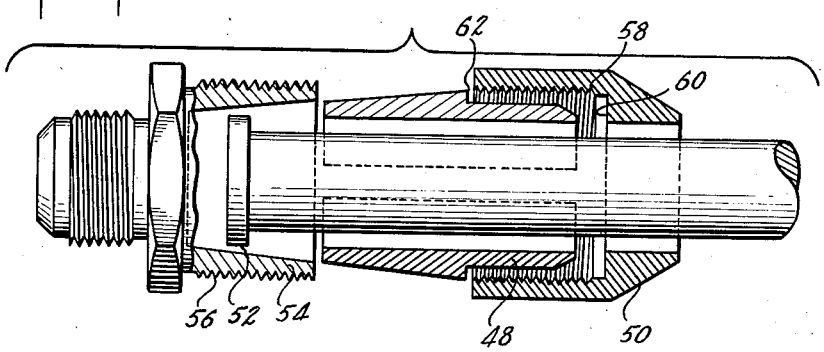
Fig. 10 is a view similar to Fig. 2 of a terminal coupling of modified form.

The coupling illustrated in Figs. 9 and 10, like the coupling of Figs. 1 and 2, is provided with a body member 46, a segmental collar 48, and a clamping nut or sleeve 50.

This coupling is particularly adapted for rods formed with upset or enlarged ends or flanges 52 so as to provide right angle shoulders. The coupling, however, may also be used to fasten rods with enlarged tapered ends, such as illustrated in Fig. 1, by forming the inner faces of the segmental collars to conform with the taper on the ends of the rods. Also it will be noted that the coupling illustrated in Fig. 1 may be used to fasten rods with enlarged heads such as shown in Figs. 9 and 11, by changing the inner face of the segmental collar to correspond with those of said Figs. 9 and 11.

In this construction, each boss 54 of the body member 46 is provided with an external screw-thread 56, and the clamping sleeve 50 is provided with an internal screw-thread 58 so that the clamping sleeve 50 may be screw-threaded over the boss 54. Also the boss 54, instead of the clamping sleeve 50, is flared or cone-shaped internally thereof. This flared surface engages corresponding flared surface portions of the segmental collar 48. The direction of the angle of these engaging flared portions is reversed to that of the angle of the flared portion of the segmental collar of the coupling shown in Fig. 1. The holding force of this coupling is particularly dependent upon a shoulder 60 in the clamping sleeve 50 which engages a shoulder 62 on each of the segments of the collar 48, and engagement of the flange 52 between the bottom wall of the hollow boss 54 and the inner ends of the segments of the collar 48.

When the parts are in their final clamping position, the coupling is securely held on the rod from longitudinal movement by the engagement of said co-engaging parts, and the rod is securely gripped by the wedging action between the segmental collar 48 and the boss 54, which prevents any looseness of parts. The coupling may be easily assembled on each rod by passing the clamping sleeve 50 over the flanged end of the rod, then applying the segmental collar about the rod, then positioning the parts together with the end of the rod engaging the bottom of the hollow boss 54, positioning the segmental collar against the flange 52, and tightly screwing the clamping sleeve 50 on the boss 54.

Figure 11:
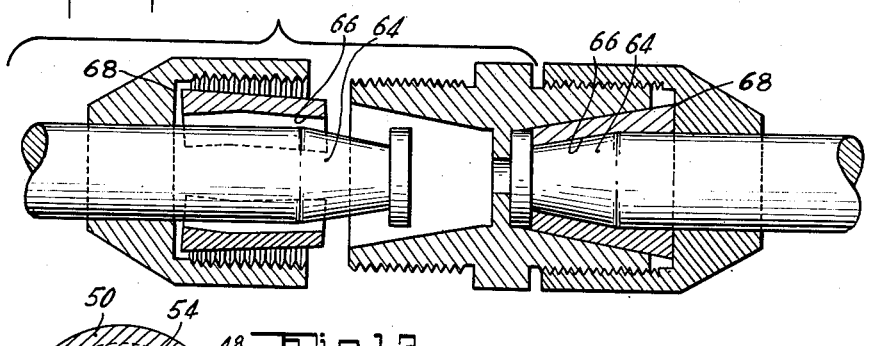
Fig. 11 is a longitudinal sectional elevation of another modified form of coupling connecting the sections of a pump rod, one of the sections being shown held by the coupling and the other section being shown in position to be applied.
Figure 12:
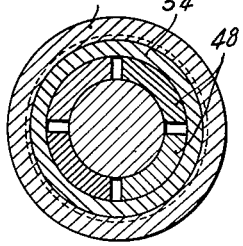
Fig. 12 is a transverse sectional view taken on the line 12—12 of Fig. 9.

In the form shown in Fig. 11 the rod or rod sections have an undercut or tapering portion 64 adjacent the flange on the end of the rod. In this coupling each of the segments of the segmental collar has its inner surface 66 shaped to fit the undercut portion 64 of the rod, and the segments of the collar are held between the flange on the rod end and a shoulder 68 in the clamping sleeve.

It will be apparent that in this form also the rod and coupling are securely held from longitudinal movement, and that the end portion of the rod adjacent the flange 52 is securely clamped by the segments of the segmental collar, thus preventing loosening of parts.

The couplings of Figs. 1, 2, 9, 10 and 11 are shown applied to rods such as sections of pump rods for deep wells, but it will be apparent that these couplings may also be used for fastening tubes in which case a suitable tube and fitting may be required. It will be understood that the term "rod" as used in the claims shall cover both solid rods and tubes. While it is preferred that the collars 8 shall be made up of contractible segments as shown, it will be understood that the collars may be made contractible by other means.

As will be evident to those skilled in the art, my invention permits various modifications without departing from the spirit thereof or the scope of the appended claims.

What I claim is:

1. In a coupling for a rod having a flared end portion, a body member having a hollow boss for receiving said end portion of the rod with the end of the rod abutting the bottom wall of said boss, a contractible collar for embracing said end portion of the rod with the interior and exterior surfaces of the inner portions of the collar flared at an angle conforming substantially to the angle of said flared end portion of the rod and with the outer portions of the collar shaped to engage the rod outwardly from said flared end portion, and a clamping sleeve embracing said collar with the interior surface thereof in close fitting engagement with said collar substantially throughout the length thereof, the inner end portion of said clamping sleeve being screw-threaded into said boss.

2. In a coupling for a rod having a flared end portion, a body member having a hollow boss at one end thereof for receiving said end portion of the rod, a segmental collar for embracing said end portion of the rod with the interior surface of its inner portion flared at an angle conforming substantially to the angle of said flared end portion of the rod, and a clamping sleeve embracing said segments with the interior surface thereof in close fitting engagement with said segments, the adjacent surfaces of the inner portions of said clamping sleeve and said segments being correspondingly flared, and the inner end portion of said clamping sleeve being screw-threaded into said boss.

3. A structure according to claim 2 in which the clamping sleeve and said segmental collar extend a distance outwardly beyond the outer end of the boss and have their outer ends beveled.

4. In a coupling for a rod having a flared end portion, a body member having a hollow boss for receiving said end portion of the rod with the end of the rod abutting the bottom wall of said boss, a contractible collar for embracing said end portion of the rod with the interior surface of its inner portion shaped to conform substantially to the said end portion of the rod, and a clamping sleeve embracing said collar with the interior surface thereof in close fitting engagement with said collar, the adjacent surfaces of the inner portions of said clamping sleeve and said collar being correspondingly flared, and said clamping sleeve being in screw-threaded engagement with said boss.

5. A structure according to claim 4 in which the bottom wall of the boss is provided with a groove adapted to receive the inner ends of the segments.

6. In a detachable coupling for a rod having an enlarged end, a body member having a hollow boss for receiving the end portion of the rod, the end thereof abutting the bottom wall of the boss, a contractible collar embracing the rod with the inner end of the collar abutting the outer side of said enlarged end, a portion of said collar within the boss having its exterior surface flared outwardly and a portion of the interior surface of said boss being correspondingly flared, and a clamping sleeve in screw-threaded engagement with said boss and engaging outwardly directed shoulders on said collar.

7. In a detachable coupling for a rod having an enlarged end, a body member having a hollow boss for receiving said end of the rod, a contractible collar embracing the rod adjacent said enlarged end, and a clamping sleeve, said clamping sleeve and said boss being screw-threaded together one within the other and one of said screw-threaded parts having a portion of its inner surface in clamping engagement with a portion of the outer surface of the contractible collar, said contractible collar by engagement with said enlarged end of the rod serving to prevent withdrawal of the rod.

ALBERT W. MILLER.

REFERENCES CITED

The following references are of record in the file of this patent:

UNITED STATES PATENTS

| Number | Name | Date |
|---|---|---|
| 580,214 | Marvel | Apr. 6, 1897 |
| 1,948,061 | Bowen | Feb. 20, 1934 |
| 2,105,182 | Church | Jan. 11, 1938 |
| 2,110,421 | Moody | Mar. 8, 1938 |
| 2,339,488 | Kratoville | Jan. 18, 1944 |

FOREIGN PATENTS

| Number | Country | Date |
|---|---|---|
| 464,026 | France | Jan. 5, 1914 |
| 118,275 | Switzerland | Dec. 16, 1926 |
| 308,381 | Great Britain | Mar. 28, 1929 |